United States Patent [19]
Sun

[11] Patent Number: 5,182,899
[45] Date of Patent: Feb. 2, 1993

[54] RAKE CONNECTION ASSEMBLY

[76] Inventor: Han-Ching Sun, No. 43, Ta-An Rd., Tien-Chung Chen, Changhwa Hsien, Taiwan

[21] Appl. No.: 817,358

[22] Filed: Jan. 6, 1992

[51] Int. Cl.$^5$ .............................................. A01D 7/06
[52] U.S. Cl. ................................. 56/400.17; 56/400.19
[58] Field of Search ........... 56/400.17, 400.01, 400.18, 56/400.19, DIG. 18

[56] References Cited

U.S. PATENT DOCUMENTS

| | | | |
|---|---|---|---|
| 2,666,288 | 1/1954 | Kimura | 56/400.17 |
| 2,847,816 | 8/1958 | Yeda | 56/400.17 |
| 3,403,500 | 10/1968 | Wirth | 56/400.17 |
| 3,668,849 | 6/1972 | Bunker | 56/400.17 |
| 4,667,461 | 5/1987 | Forbes | 56/400.17 X |
| 4,682,464 | 7/1987 | Sun | 56/400.17 |

Primary Examiner—Terry Lee Melius
Attorney, Agent, or Firm—Ladas & Parry

[57] ABSTRACT

A rake has a long handle and a projecting prong section. The prongs of the projecting prong section are held between an elongated upper clamping sheet and an elongated lower clamping sheet. A bolt extends through the fastener hole of the handle and the hole of the upper clamping sheet to engage in the threaded hole of the lower clamping sheet so as to fasten the lower end of the handle to the projecting prong section. A generally U-shaped retaining member has two ends which are bent inwardly so as to form a rectangular loop, thereby clamping the upper ends of the prongs in the retaining member. The upper plate portion of the retaining member is pressed to form a retaining hole in the upper end thereof. A generally Z-shaped connecting sheet has an upper plate portion fastened to the lower portion of the handle, a lower plate portion inserted into and confined within the retaining hole of the retaining member, and a connecting portion interconnecting the upper and lower plate portions.

3 Claims, 4 Drawing Sheets

I

RAKE CONNECTION ASSEMBLY

BACKGROUND OF THE INVENTION

1. Field of the Invention

This invention relates to a rake, more particularly to a rake with an improved connector structure for detachably connecting a long handle to a projecting prong section.

2. Description of the Related Art

Referring to FIG. 1, a conventional bamboo rake has a projecting prong section (1) that is generally shaped in the form of a sector which is used for gathering grass, leaves and other material. A long handle (2) is fastened to the projecting prong section (1) by means of a lock bolt unit (3) and a retaining ring (4). The lock bolt unit (3) fastens the lower end of the handle (2) to the projecting prong section (1) and interlocks two clamping sheets (5). The retaining ring (4) retains the upper end of the projecting prong section (1) on the handle (2). The construction of the retaining ring (4) renders it difficult to detach the handle (2) from the projecting prong section (1), causing difficulty in transporting the rake.

SUMMARY OF THE INVENTION

It is therefore the main object of this invention to provide a rake with an improved connector structure for detachably connecting a long handle to a projecting prong section.

According to this invention, a rake has a long handle and a projecting prong section. The prongs of the projecting prong section are held between an elongated upper clamping sheet and an elongated lower clamping sheet. A bolt extends through the fastener hole of the handle and the hole of the upper clamping sheet to engage threadably with the threaded hole of the lower clamping sheet so as to fasten the lower end of the handle to the projecting prong section. A generally U-shaped retaining member has two ends which are bent inwardly so as to form a rectangular loop, thereby clamping the upper ends of the prongs in the retaining member. The upper plate portion of the retaining member is pressed to form a retaining hole in the upper end thereof. A generally Z-shaped connecting sheet has an upper plate portion fastened to the lower portion of the handle, a lower plate portion inserted into and confined within the retaining hole of the retaining member, and a connecting portion interconnecting the upper and lower plate portions.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
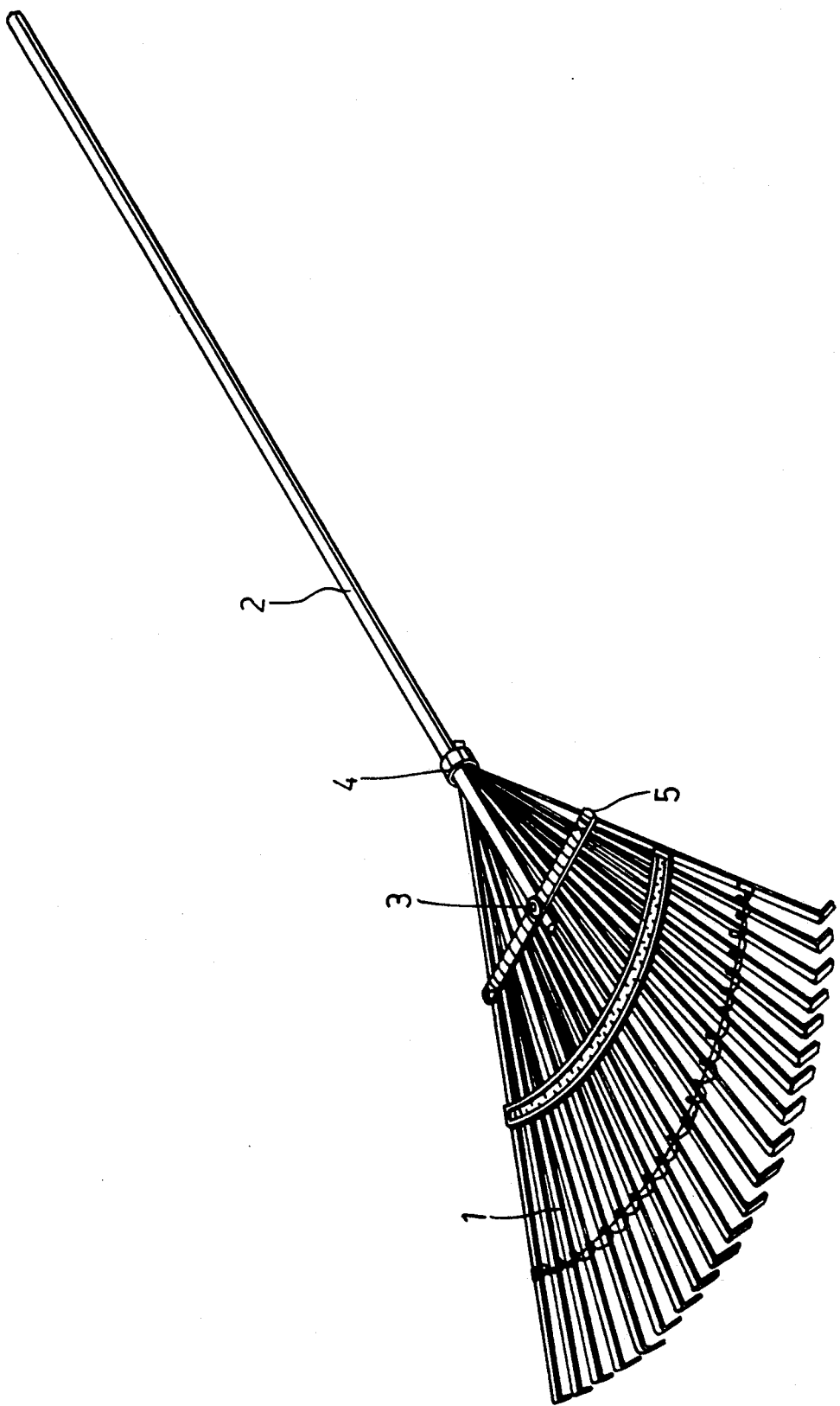
FIG. 1 shows a conventional bamboo rake.
Figure 2:
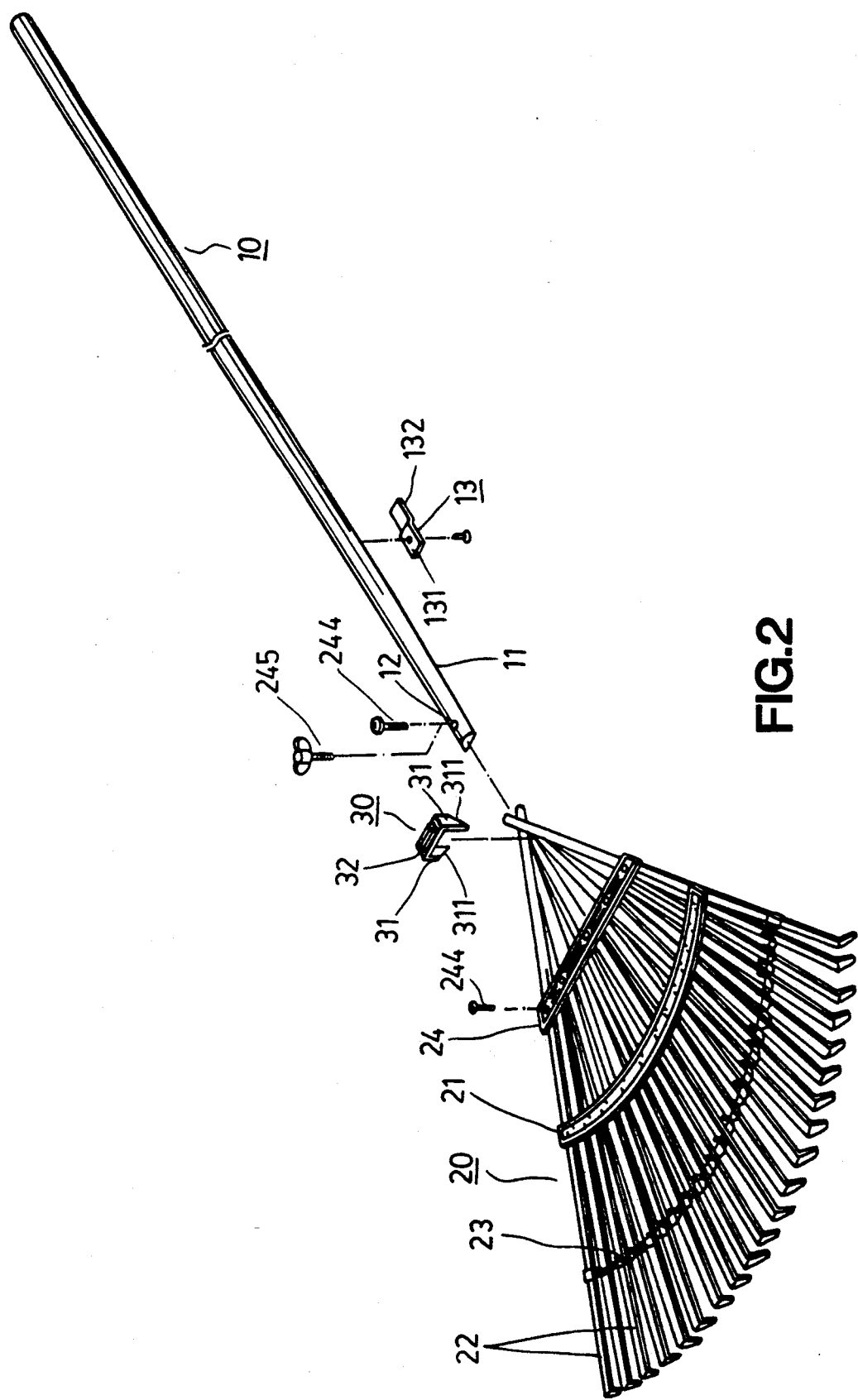
FIG. 2 is an exploded view showing a rake of this invention.
Figure 3:
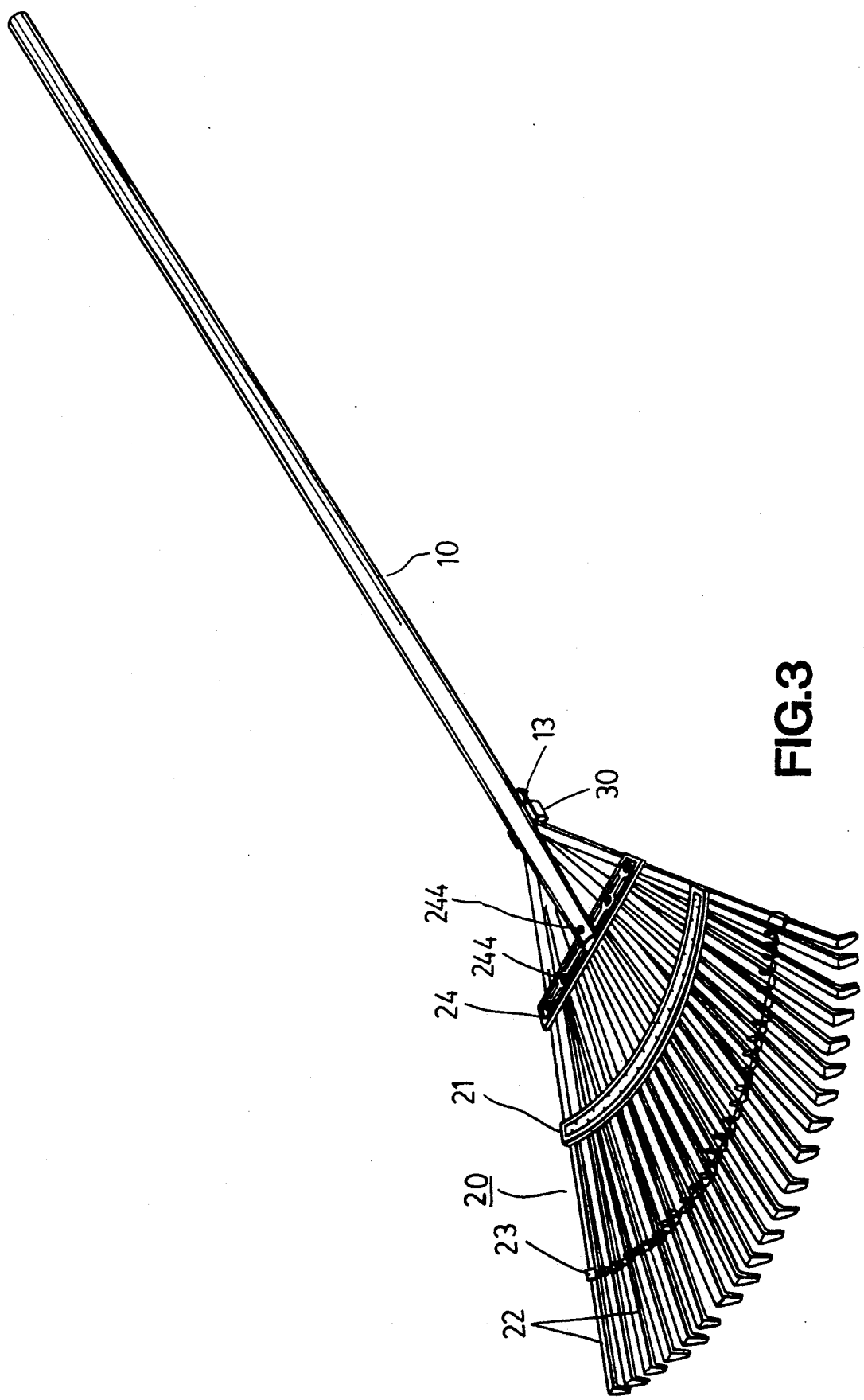
FIG. 3 is an assembled view showing the rake of the invention.
Figure 4:
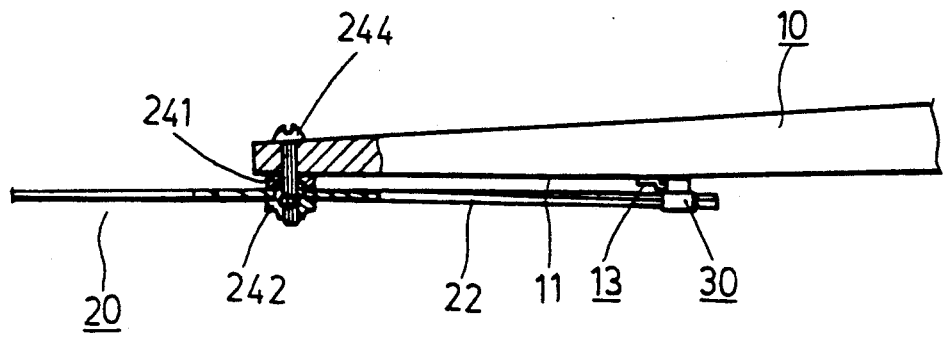
FIG. 4 illustrates a connector structure for interconnecting the handle and the projecting prong section of the rake according to this invention.

Referring to FIG. 2, a rake of this invention includes a long handle (10) and a projecting prong section (20) which is generally shaped in the form of a sector. The handle (10) has an inclined planar bottom surface (11) in the lower end portion thereof. A fastener hole (12) is formed through the lower end of the handle (10). A Z-shaped connecting sheet (13) has an upper plate portion (131) screwed to the lower portion of the handle (10), a lower plate portion (132), and a connecting portion interconnecting the upper and lower plate portions (131, 132).

The projecting prong section (20) includes a positioning plate unit (21) for limiting the orientation of the prongs (22), a looped wire (23), and a clamping unit (24). The positioning plate unit (21) and the looped wire (23) are mounted on the rake in a known manner.

Figure 5:
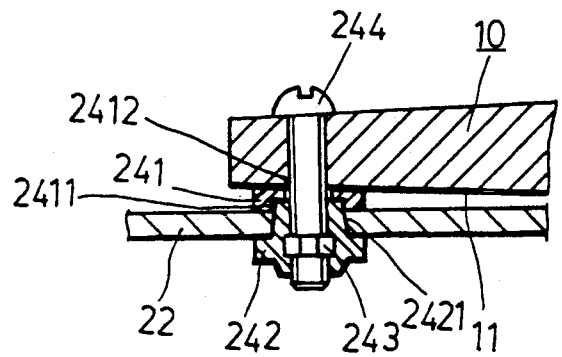
FIG. 5 is a schematic sectional view illustrating the connection between the lower end of the handle and the projecting prong section of the rake according to this invention.

Referring to FIG. 5, the clamping unit (24) consists of an elongated upper clamping sheet (241) and an elongated lower clamping sheet (242). The upper clamping sheet (241) has a generally planar top surface which abuts against the inclined surface (11) of the handle (10). The upper clamping sheet (241) has five recesses (2411) formed in the bottom surface thereof, and five holes (2412) formed through the upper clamping sheet (241). The lower clamping sheet (242) includes five tongues (2421) projecting therefrom, which extend through the preformed holes of the prongs (22) to engage in the recesses (2411) of the upper clamping sheet (241). Five nuts (243) are embedded in the lower clamping sheet (242). Five round-headed bolts (244) (only two are shown in FIG. 2 for clarity) extend through the holes (2412) of the upper clamping sheet (241) and through the central holes of the tongues (2421) to engage with the nuts (243). One of the bolts (244) further extends through the fastener hole (12) of the handle (10) and may be replaced with a butterfly-headed bolt (245).

Figure 6:
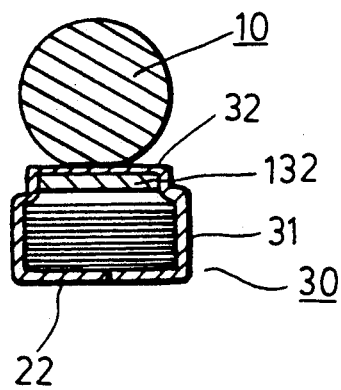
FIG. 6 is a schematic sectional view illustrating the connection between the upper end of the projecting prong section and the handle of the rake according to this invention.

A generally U-shaped retaining member (30) rides on the upper end of the projecting prong section (20) and has two parallel legs (31) and an upper plate portion interconnecting the upper ends of the legs (31). The upper plate portion is pressed to form a retaining hole (32) in the upper end of the retaining member (30). As best shown in FIG. 6, the legs (31) have lower ends (311) which are bent inwardly to form a rectangular loop so as to clamp the upper ends of the prongs (22) in the retaining member (30). The lower plate portion (132) of the connecting sheet (13) is inserted into and confined within the retaining hole (32) of the retaining member (30) so as to fasten the upper end of the projecting prong section (20) to the handle (10).

When it is desired to detach the handle (10) from the projecting prong section (20), one only needs disengage the lower plate portion (132) of the connecting sheet (13) from the retaining hole (32) of the retaining member (30) and remove the second bolt (244 or 245) from the fastener hole (12) of the handle (10). This simple dismounting process makes transporting the rake convenient.

With this invention thus explained, it is apparent that numerous modifications and variations can be made without departing from the scope and spirit of this invention. It is therefore intended that this invention be limited only as indicated in the appended claims.

I claim:

1. A rake having a long handle and a projecting prong section generally shaped in the form of a sector, said projecting prong section being attached to a lower end portion of said handle at an upper end portion thereof and including a plurality of prongs, an upper clamping sheet and a lower clamping sheet, said upper and lower clamping sheets holding said prongs therebetween, characterized by:

said upper clamping sheet having several holes formed therethrough and several recesses formed in a bottom surface thereof;

each of said prongs having a hole formed therethrough;

said lower clamping sheet including several threaded holes formed therein in alignment with said holes of said upper clamping sheet, and several tongues projecting from said lower clamping sheet to pass through said holes of said prongs, each of said tongues having an upper end portion which is engaged in one of said recesses so as to position said prongs between said upper and lower clamping sheets;

said handle having a fastener hole formed through a lower end thereof;

several bolts extending through said holes of said upper clamping sheet to engage in said threaded holes of said lower clamping sheet so as to clamp said prongs between said upper and lower clamping sheets, one of said bolts extending through said fastener hole of said handle in such a manner that said lower end portion of said handle is located above said upper and lower clamping sheets;

a generally U-shaped retaining member having two parallel legs, an upper plate portion interconnecting upper ends of said legs and pressed to form a retaining hole in an upper end of said retaining member, and two ends bent inwardly so as to form a rectangular loop, thereby clamping upper ends of said prongs in said retaining member; and a generally Z-shaped connecting sheet having an upper plate portion fastened to a lower portion of said handle, a lower plate portion inserted into and confined within said retaining hole of said retaining member, and a connecting portion interconnecting said upper and lower plate portions of said connecting sheet.

2. A rake as claimed in claim 1, wherein said lower clamping sheet includes several nuts embedded therein in which said threaded holes are formed.

3. A rake as claimed in claim 1, wherein said lower end portion of said handle has an inclined planar surface, said upper clamping sheet having a generally planar top surface which abuts against said inclined planar surface of said handle so as to enhance firm binding between said handle and said projecting prong section.

* * * * *